United States Patent [19]

Weber

[11] Patent Number: 5,502,917
[45] Date of Patent: Apr. 2, 1996

[54] METHOD OF MAKING A FISHING LURE

[75] Inventor: Ronald W. Weber, Edina, Minn.

[73] Assignee: Normark Corporation, Minnetonka, Minn.

[21] Appl. No.: 372,961

[22] Filed: Jan. 17, 1995

Related U.S. Application Data

[62] Division of Ser. No. 68,438, May 27, 1993, Pat. No. 5,396,728.

[51] Int. Cl.⁶ .................................................. A01K 85/00
[52] U.S. Cl. .................................................. 43/42.53
[58] Field of Search ........................... 43/42.53, 42.45, 43/42.39, 42.5, 42.52, 42.43, 42.4, 44.96, 44.97

[56] References Cited

U.S. PATENT DOCUMENTS

| | | | |
|---|---|---|---|
| 1,295,370 | 2/1919 | Porter | 43/44.81 |
| 3,497,987 | 3/1970 | Perrin | 43/42.53 |
| 3,611,614 | 10/1971 | Ward | 43/42.24 |
| 4,425,730 | 1/1984 | Goetz, Jr. | 43/42.43 |
| 4,899,483 | 2/1990 | Pippert | 43/42.42 |
| 4,926,577 | 5/1990 | Radtchenko | 43/42.22 |
| 4,945,669 | 8/1990 | Webel | 43/42.39 |
| 5,077,930 | 1/1992 | Berry | 43/42.22 |
| 5,133,146 | 7/1992 | Stecher | 43/42.5 |
| 5,222,321 | 6/1993 | Lu | 43/44.81 X |
| 5,245,782 | 9/1993 | Pahle | 43/42.37 X |

OTHER PUBLICATIONS

DeLong Lures 1983–1984 Catalog, "Baby Tad," p. 8.
Edw. K. Tyron Co. 1953, "Pearl Minnow," p. 128.

Primary Examiner—P. Austin Bradley
Assistant Examiner—Jeanne M. Elpel
Attorney, Agent, or Firm—Jennifer K. Farrar

[57] ABSTRACT

A method of constructing a sinking fishing lure is disclosed. The method includes the steps of providing a fishing line connector, providing a weight having a means for anchoring a fishing line connector, anchoring the fishing line connector to the weight, and molding a plastic body over the weight with the anchored fishing line connector.

2 Claims, 6 Drawing Sheets

METHOD OF MAKING A FISHING LURE

This is a Divisional of case Ser. No. 08/068,438 filed on May 27, 1993 for FISHING LURE, now U.S. Pat. No. 5,396,728.

BACKGROUND OF THE INVENTION

The present invention relates to fishing lures, and in particular, fishing lures which sink. Most particularly, the present invention relates to weighted fishing lures which have a predatory fish attracting motion when pulled through the water and orient themselves in a particular manner when allowed to sink.

Fishing with natural live bait, such as minnows, has been practiced since ancient times. The effectiveness of a minnow on a hook in attracting and hooking predatory game fish, even in the presence of schools of wild minnows, is presumably due to the appearance of vulnerability associated with the bait minnow. That is, to the predatory fish, the bait minnow appears as a food source requiring relatively lower energy output than a healthy wild minnow. In modern times, fishermen have increasingly turned to artificial lures since artificial lures are more convenient than natural live bait and avoid the potential for disease transmission into the fish population. A challenge to the fishing lure industry has been to mirror and/or exceed the effectiveness of natural live bait such as minnows.

Fishing lures which are weighted so as to cause them to sink through the water are well known. Three examples of representative sinking lures are as follows: First, a jig-type lure, which in its most basic form consists of a lead weight molded onto the shank of a hook adjacent the eye of the hook. Jig-type lures often are characterized by a tendency to drop though water in an orientation such that the lead weight portion of the lure leads the lure downward. Second, a metal spoon-type lure which typically consists of a single piece of metal sheet stamped into a bowl shape and having a treble hook at one edge and an eyelet at an opposite edge. Spoon-type lures often include a slight asymmetric characteristic in the stamping which results in a helical motion when pulled through water. Third, a full-bodied lure having an overall density such that it sinks through the water. Some well known full-bodied sinking lures simulate the shape of a minnow and may also wiggle slightly when pulled through the water if a forward mounted blade surface is present.

Although such prior art sinking lures have been effectively used to catch fish, there remains an as yet unsatisfied need within the fishing sport to provide sinking lures which are characterized by motions which simulate a particularly vulnerable bait fish and, at the same time, retain much of the appearance of a bait fish. If certain key motions can be exaggerated, then the lure will be even more effective than natural live bait in attracting and hooking predatory game fish. Artificial fishing lures selectively exaggerating the most effective game fish attracting motions of a vulnerable minnow are believed to be unavailable until the development of the present invention.

SUMMARY OF THE INVENTION

The present invention is a significant advance over prior art sinking lures. Specifically, it has a body with an exterior appearance closely resembling many of the most distinctive features of a bait fish, while simultaneously including, as integral to the body shape, a combination of surfaces which provide desirable hydrodynamic action when pulled through the water or when allowed to settle. The resulting hydrodynamic action of the lure simulates and even exaggerates the key motions of a particularly vulnerable bait fish, thereby offering a fisherman a highly effective artificial fishing lure.

In one embodiment, the present invention is a fishing lure. The inventive fishing lure includes an elongated body, a fishing line connecting means adjacent the proximal end of the body and a fish hooking means distally provided on the elongated body. The elongated body includes a proximally located minnow-head simulating portion, and means for generating an oscillatory rolling motion in response to proximally directed motion of the elongated body through the water. A dense mass or weight is enclosed or encapsulated within the minnow head portion of the elongated plastic body. By "oscillatory rolling motion" herein is meant a repetitive and alternating two part movement wherein the first part is a rotational movement of the lure about a longitudinal axis, in a first direction of rotation, followed by a second part which is a reversal of the direction of rotation, to provide an opposite rotational movement. (Swings and rockers provide examples of such motion, but do not normally move along the axis of such motion.) These two alternating motions occur while the lure is pulled forward through water.

Preferably, the means for generating the oscillatory, rolling motion in response to proximally directed motion of the elongated body through the water involves a spoon portion having a generally downward directed convex surface and a generally upward-directed concave surface nested therein. In the preferred embodiment, the convex surface is shallower than the concave surface, such that the spoon surfaces meet at a rim along the distal portion of the spoon. Preferably, the rim is slighlty rounded to avoid a sharp edge. Additionally, the means for generating oscillatory, rolling motion further includes a transition surface connecting the minnow head simulating portion of the body to the concave surface of the spoon portion. Preferably, the minnow head portion of the lure is oriented with respect to the spoon portion of the lure such that a side of the minnow head portion is generally radially aligned with the concave surface and the opposite side of the minnow head portion is generally radially aligned with the convex surface of the spoon portion.

In a preferred embodiment, when pulled proximally through the water, the lure rolls at least 90° and preferably approximately 180°, from side to side, about a longitudinal axis of the lure. Further, when allowed to settle downward, the lure orients itself with the simulated minnow head generally lower than the remainder of the lure and with the side of the simulated head which is aligned with the convex surface of the spoon generally facing downward.

The present invention also includes a method of constructing a fishing lure including the steps of: providing a fishing line connector, providing a weight having means for anchoring a means for anchoring a fishing line connector, anchoring a fishing line connector to the weight, molding a plastic body about the weight subsequent to anchoring the fishing line connector to form a sinking fishing lure. The thus constructed lure may then be painted. The method may additionally include the step of anchoring a weed guard device to the weight prior to molding the plastic body. Preferably, the weed guard device is an extension of the fishing line connector, and most preferably the weed guard device and the fishing line connector are formed from a wire and has a proximal loop, adapted for connecting to a fishing line, the loop having a first leg and a second leg each extending distally from the loop, the second leg having a distal elbow and a weed guard extending therefrom.

DETAILED DESCRIPTION OF THE PREFERRED EMBODIMENTS

Figure 1:
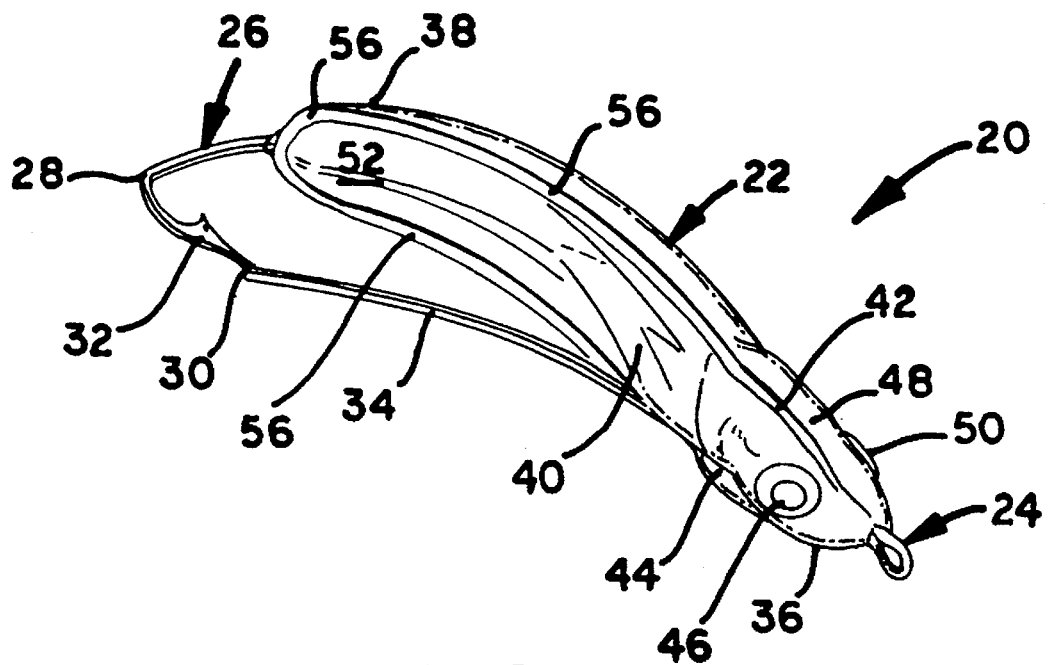
FIG. 1 is a perspective view of a preferred embodiment of the present invention.

In a first embodiment, the present invention is a fishing lure 20, as shown in FIG. 1. The fishing lure 20 has an elongated body 22 and a proximally located eyelet 24 which is intended for connection to a fishing line, either through a leader or directly to the fishing line. Additionally, the lure 20 has a hook 26 distally located on the body 22. In the embodiment depicted in FIG. 1, a majority of the shank of the hook 26 is enclosed within the body 22 thereby rendering the hook 26 rigidly connected to the body 22. The hook 26 includes a bight 28, a point 30 and a barb 32. The point 30 of the hook 26 is generally directed proximally on the lure 20, i.e., generally toward the eyelet 24. Note that the bight 28 is situated such that the point 30 lies above the body 22. Further, the barb 32 is inwardly directed i.e., within the sweep of the bight 28. Additionally, the preferred embodiment includes a "weedless" spring 34 emerging from the body 22 and projecting generally toward or slightly in front of point 30. The weedless spring 34 serves to reduce the tendency of weeds and debris to become engaged within the bight 28 of hook 26.

The body 22 includes a minnow-head simulating portion 36, a spoon portion 38 and a transition portion 40. The head portion 36 includes a dorsal portion 42, a right side 44 with a right eye 46, a left side 48 and left eye 50, and has the eyelet 24 projecting generally in the region where one might expect a mouth on an actual minnow. This minnow-head portion 36 is oriented such that under circumstances when the lure 20 is allowed to drop downward through water, the right side 44 and right eye 46 of the minnow-head portion 36 are directed generally upward and left side 48 and left eye 50 are directed generally downward. Further, due to the distribution of weight within the lure 20 and the hydrodynamic forces produced by the spoon portion 38 and transition portion 40 when dropping through water, the minnow head portion 36 tends to lead the lure 20 downward.

Preferably, the body 22 is formed of suitable plastic material, such as thermoset or thermoplastic material. Epoxy, is a convenient material from which to form the body of the lure. The body 22 may be painted and metallic paints are preferred.

Figure 2:
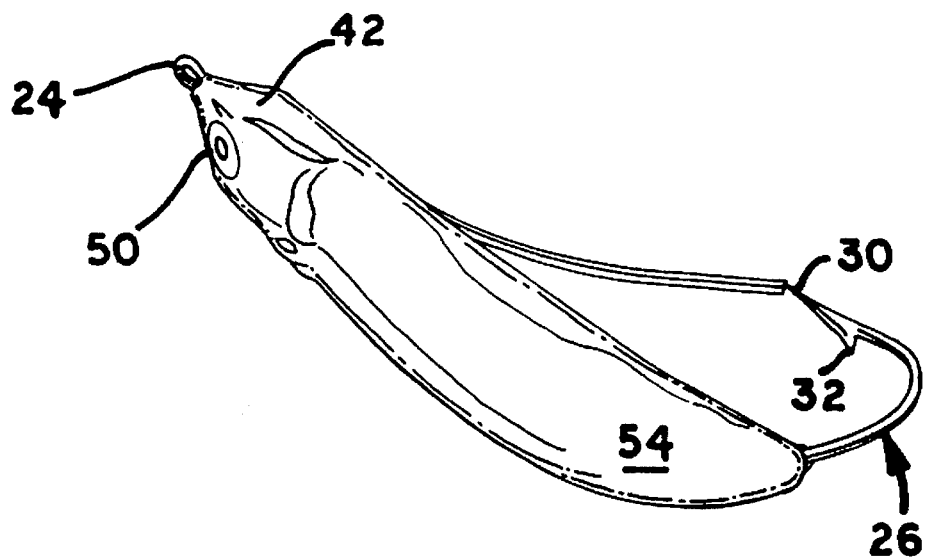
FIG. 2 is another perspective view of the embodiment of FIG. 1.
Figure 3:
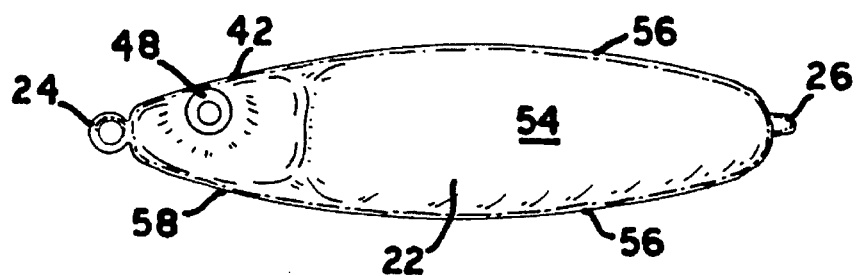
FIG. 3 is a bottom plan view of the embodiment of FIG. 1.
Figure 4:
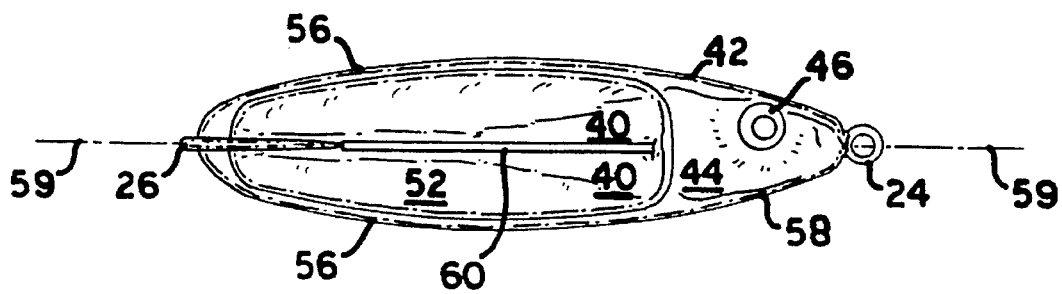
FIG. 4 is a top plan view of the embodiment of FIG. 1.
Figure 5:
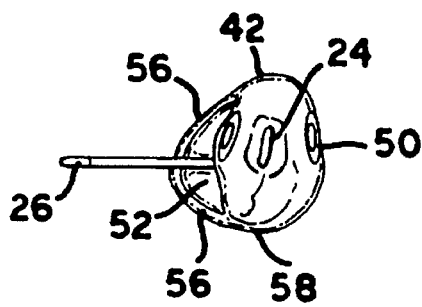
FIG. 5 is a side elevational view showing the proximal end of the embodiment of FIG. 1.

Spoon portion 38 includes a concave surface 52 and a convex surface 54 (as shown in FIG. 2). Concave surface 52 is nested within convex surface 54, and these surfaces 52 and 54 are spaced apart by the thickness of the body 22 in the spoon portion 38. Generally, the concave surface 52 is shallow relative to convex surface 54, and therefore, the spacing between the concave surface 52 and the convex surface 54 tends to be greater near the center of the spoon portion 38. Both concave and convex surfaces 52 and 54 are somewhat irregular and are elongated generally along the major elongate axis of the lure 20. Without wishing to be bound to true radii of curvature or any regular mathematical surface description, and only by way of further description of the general nature of surfaces 52 and 54, if these surfaces were actually corresponding to portions of spheres or ellipsoids, then, the radius of curvature within each surface 52 and 54 would be greater on a longitudinal arc than on a transverse arc. Additionally, the radius of both longitudinal and transverse curvature would be slightly greater on the concave surface 52 than on the convex surface 54 such that both surfaces intersect at a rim 56 which extends generally about the rearward two thirds of the body 22 and merges into the dorsal 42 and ventral portions 58 of the minnow-head portion 36, as shown in FIGS. 3 and 4. It should be noted, however, that the terms "radius of curvature" whether in reference to either longitudinal or transverse, are included herein for purposes of facilitating description and comprehension of the embodiment and the essence of the spoon portion 38 of the lure 20. Indeed the lure 20 itself is present in somewhat irregular surface shapes which deviate from true regular mathematical surfaces and the radii defining any such regular surfaces and are merely concave or convex, with the concave surface being shallower than the convex.

The transition surface 40 as shown in FIG. 4 leads from the right side 44 of the minnow-head portion 36 down into the concave surface 52 of the spoon portion 38. Preferably, the transition portion 40 has a generally conical projecting surface about a generally longitudinal axis 59 with an apex 60 situated roughly in the center of the concave surface 52. In other words, the transition surface 40 has a radius of curvature adjacent the minnow-head portion 36 approximating the radius of curvature of the right side 44 of the minnow-head surface 36 and has a progressively smaller radius of curvature as it approaches the apex 60.

Figure 6:
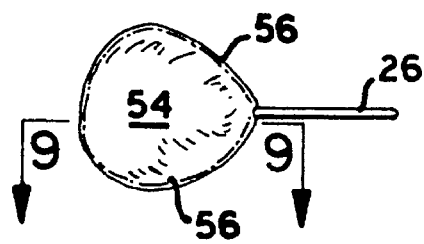
FIG. 6 is a side elevational view showing the distal end of the embodiment of FIG. 1.
Figure 7:
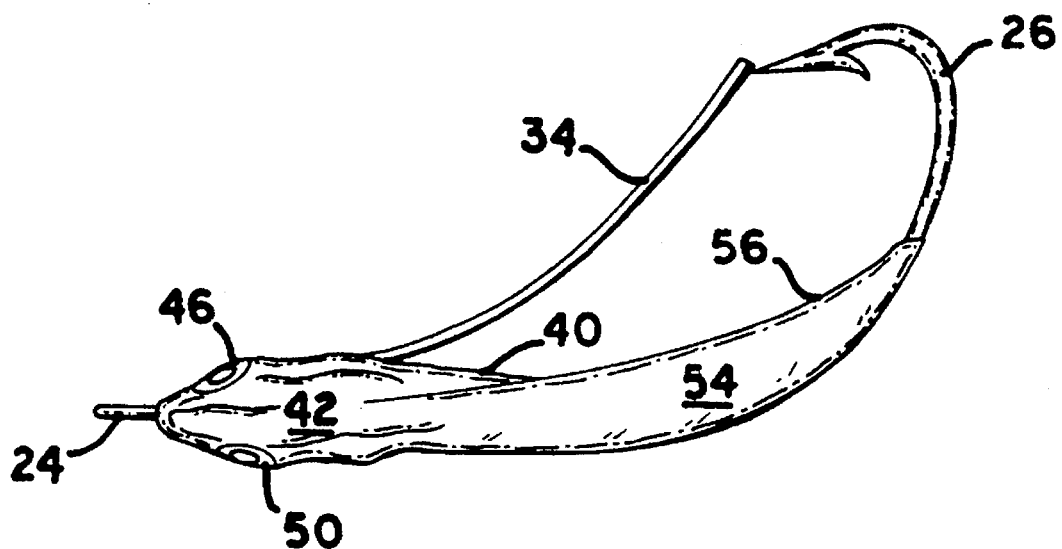
FIG. 7 is a front elevational view of the embodiment of FIG. 1.
Figure 8:
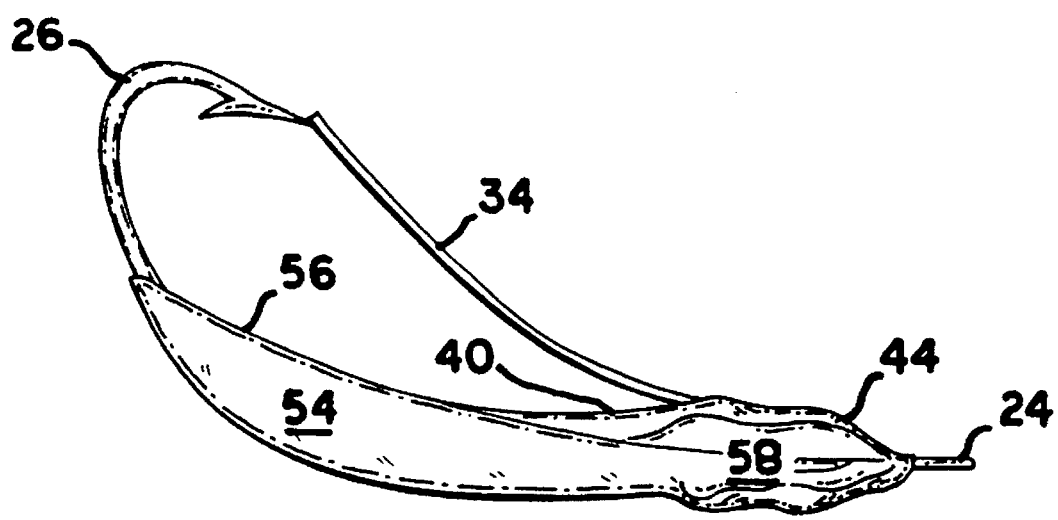
FIG. 8 is a rear elevational view of the embodiment of FIG. 1.

The convex surface 54, as shown in FIGS. 3 and 6, also conveys an impression of a body of a minnow extending from the head 36, with the tail of such a minnow curving away and toward the right side of the minnow. Similarly, as shown in FIGS. 4, 5, 7 and 8, the transition surface 40 conveys the impression of a minnow body extending from the head portion 36 and the concave portion 52 roughly approximates the appearance of a tail portion of a minnow curving toward the right side of the minnow.

Figure 9:
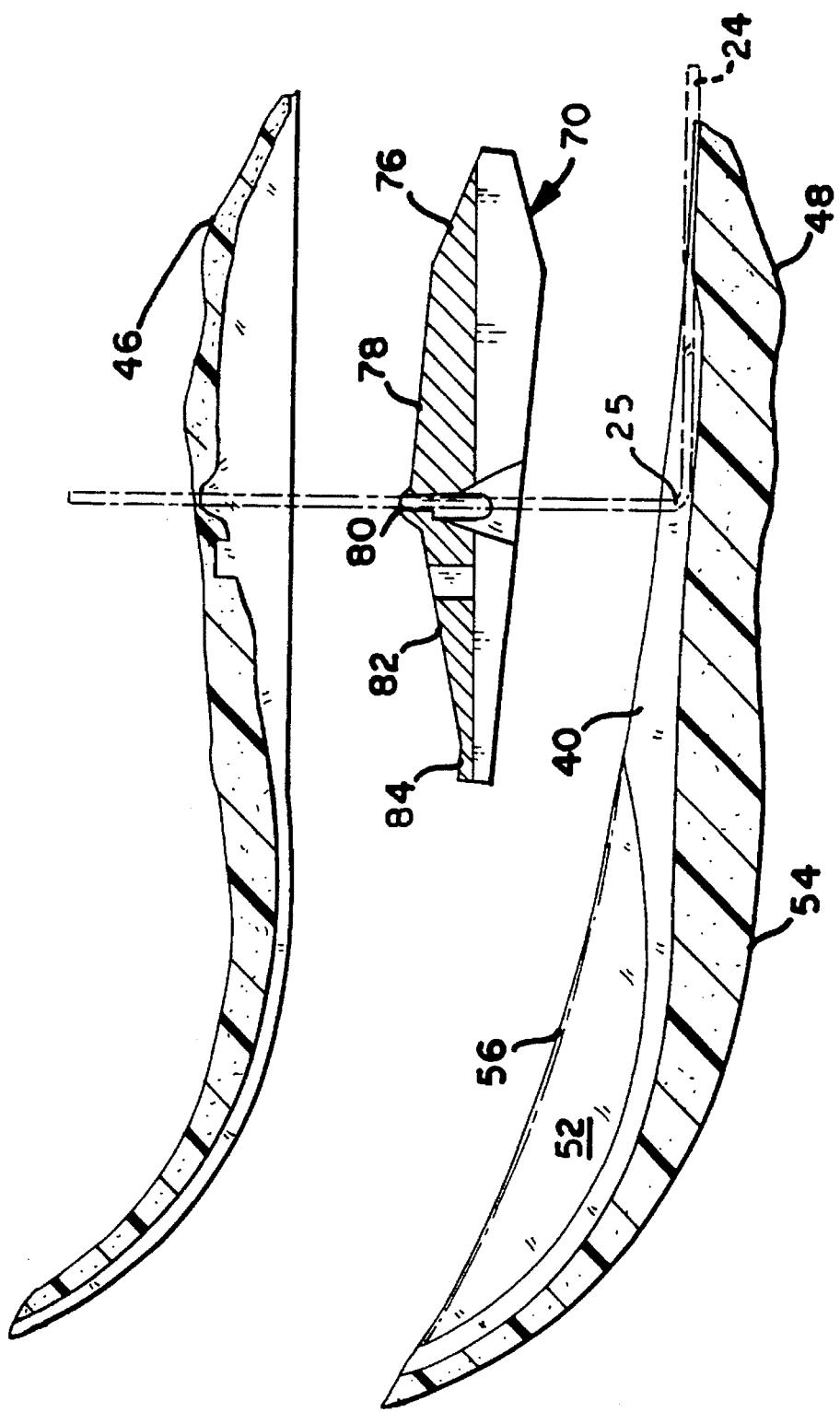
FIG. 9 is an exploded partial sectional view of FIG. 6; at 9—9.
Figure 10:
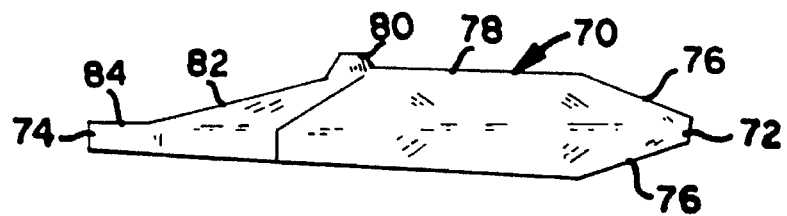
FIG. 10 is a rear elevational view of the weight portion of the present invention.
Figure 11:
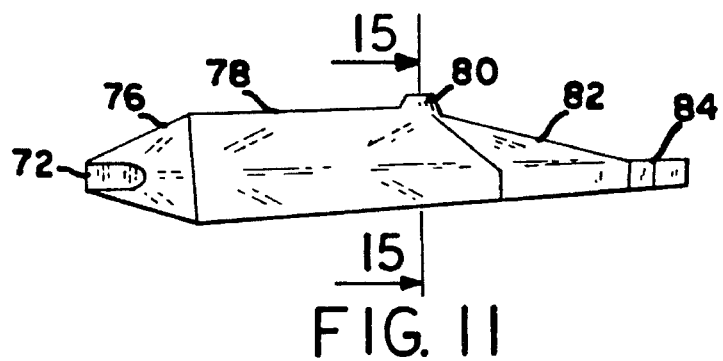
FIG. 11 is a front elevational view of the weight portion of the present invention.
Figure 12:
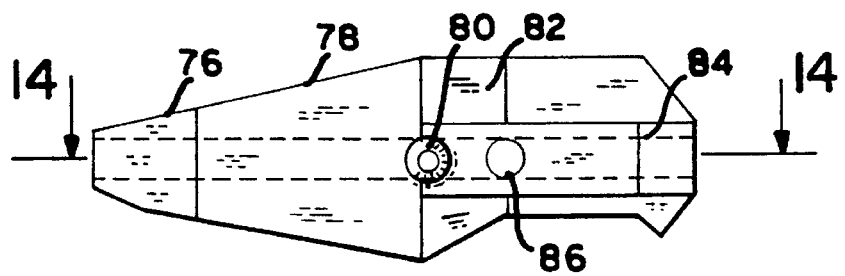
FIG. 12 is a top plan view of the weight portion of the preferred embodiment.
Figure 13:
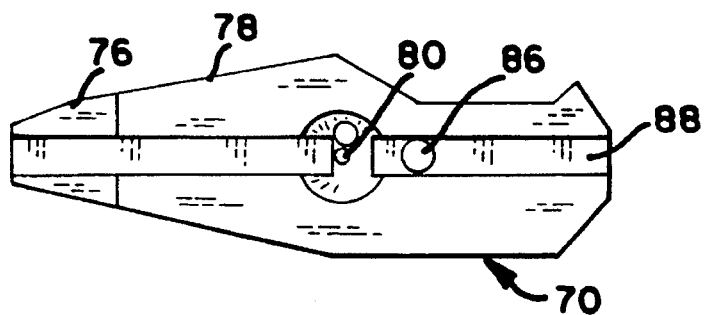
FIG. 13 is a bottom plan view of the weight portion of the preferred embodiment.
Figure 14:
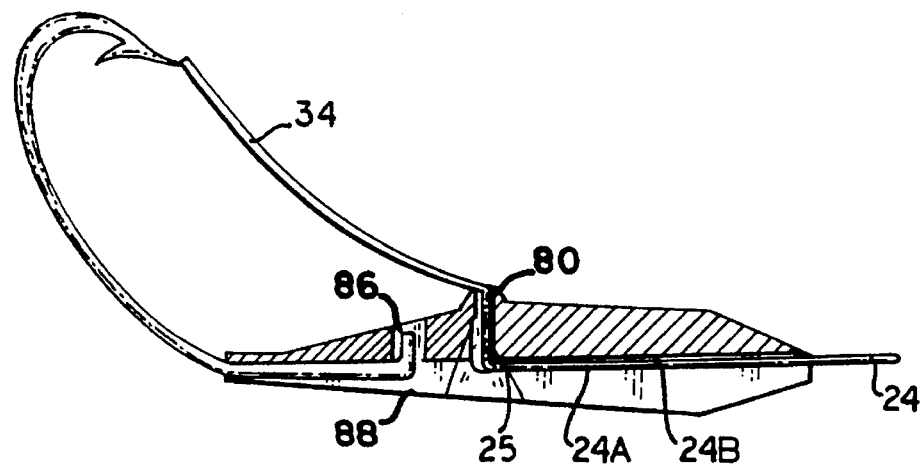
FIG. 14 is a sectional view at 14—14 of FIG. 12.
Figure 15:
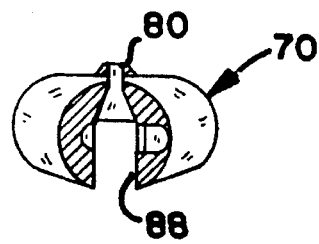
FIG. 15 is a sectional view at 15—15 of FIG. 11.

FIG. 9 shows an exploded sectional view at 9—9 of FIG. 6. A weight 70 is embedded or encapsulated primarily located within the head portion 36. The weight 70 is shown in greater detail in FIGS. 10 through 15, and may be formed of a variety of dense materials such as lead or zinc. The weight 70 includes a proximal end 72 and a distal end 74. A conical surface 76 is located adjacent the proximal end, a second conical surface 78, an aperture 80, a flat bevel 82 and a rearward portion 84. Referring to FIG. 13, a square cut channel 88 extends longitudinally along the bottom side of the weight 70.

Production of the lure 20 may be accomplished by providing a hook having an elbow on its shank rather than an eyelet. The portion of the shank leading to the elbow may be placed in the channel 88 leading rearward from the weight with the small projection from the elbow disposed within aperture 86. Similarly, a wire leading rearward from the eyelet 24 may also have an elbow 25 with its projection 34 received in and optionally extending through aperture 80.

Most preferably, if a weed guard 34 is to be provided, a single piece of wire may be bent to provide a loop 24 with a pair of legs 24 A and 24 B, one of the legs having an elbow 25 which in turn extends to further serve as the weed guard 34. Most preferably, the weed guard extension 34 is bent slightly rearwardly after passing outward of the apperature 80 to terminate adjacent the point 30 of the hook 26 and is stamped, in advance, to a rectangular cross section in the portion of the wire corresponding to the weed guard 34.

Aperture 80, may also alternatively serve to receive a separate spring or weed guard 34. After assembling these portions, the weight 70 and wire assemblies of the lure may be placed within a body mold and injected with plastic material to form the body 22, thereby encasing the weight and anchored portions hook 26 and eyelet 24 assemblies. Alternatively, the hook 26 may lack an elbow and rely solely upon interaction with the plastic body to anchor the shank.

The motion of the fishing lure 20 as it is pulled towards its proximal end through water is a rolling oscillation generally about a longitudinal axis. Specifically, the upper side of the fishing lure, (i.e. the right eye 46 and concave surface 52) oscillates between a first extreme where the top side (i.e., right eye 46) faces generally horizontally then proceeds to roll such that the right eye 46 faces generally upward and continues to roll toward a second extreme position wherein the left eye faces generally horizontally and opposite from the first extreme position. This oscillation continues as the lure is pulled forwardly, (i.e. proximally) through water. This oscillation corresponds to about a 180 degree roll about the longitudinal axis 59 of the lure 20.

While not wishing to be bound by theory, it is believed that the rolling oscillation is a result of hydrodynamic action produced by the interaction of the various surfaces of the lure 20 with water moving longitudinally over the lure 20 from the proximal end toward the distal end. Most important to this interaction is believed to be the concave, convex and transition surfaces 52, 54 and 40. Further the weight 70 is believed to contribute to the reversal of rolling oscillation at each extreme. Presumably, a dumping or temporary loss of pressure differential between the concave and convex surfaces 52 and 54 occurs when the lure 20 approaches each extreme of its roll and the lure 20 begins to roll in the opposite direction. Presumably, a change in the size and/or curvatures of these surfaces 52, 54 and 40 or changes in the weight 70 or its fore and aft placement within the lure 20 would alter the approximately 180° angle between the extremes.

Additionally, when forward motion of the lure 20 is terminated, and the lure 20 is allowed to settle downward through water, it tends to settle such that the spoon portion 38 is generally directed upward, with the head portion 36 settling ahead of the distal spoon portion 38. One of ordinary skill in this art will quickly recognize that such a lure 20 may be fished by either a steady retrieve upon a fishing line causing its distinctive rolling oscillatory motion about its longitudinal axis 59 as it travels longitudinally through the water, or alternatively, an intermittent retrieve with periodic opportunities for the lure 20 to settle downward through the water. Both methods of fishing the present invention are believed to be highly effective and extremely attractive to predatory fish. In general, the two forms of motions of the fishing lure 20 tend to simulate the erratic behavior of a vulnerable bait fish, such as an injured minnow, and are particularly attractive to predatory fish. This, in turn, renders the present invention highly effective in catching fish.

Figure 16:
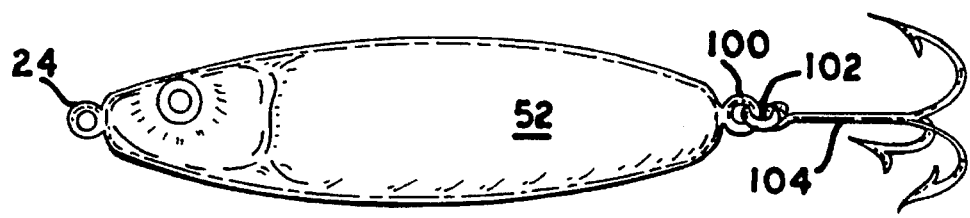
FIG. 16 is a top plan view of an alternative embodiment of the present invention.

In an alternative embodiment, depicted in FIG. 16, distal eyelet 100 carrys a split ring 102 and, in turn, a treble hook 104. Although this alternative embodiment lacks the generally upward directed hook feature of the first embodiment, as well as the weedless feature, in some open water fishing situations, the advantages of two additional points of the treble hook 104 outweigh the disadvantage of eliminating a rigid hook. Of course, those of ordinary skill in the art will recognize that other hooks, such as weedless treble hooks or accessories may also be attached to the distal eyelet 100 and take advantage of the distinctive motion of the lures of this invention.

Although the present invention has been described with reference to the preferred embodiments, workers skilled in the art will recognize that changes may be made in form and detail without departing from the spirit and scope of the invention.

What is claimed is:

1. A method of constructing a sinking fishing lure, the method comprising the steps of:

providing a fishing line connector;

providing a weight having a means for anchoring the fishing line connector wherein the means for anchoring is an aperture in the weight oriented generally transverse to an elongate axis of the weight and the fishing line connector is a loop formed in a wire, the wire further including a leg with an elbow, adapted for insertion within the aperture of the weight, the wire further including an extension of the elbow, the extension suitable for service as a weed guard;

anchoring the fishing line connector to the weight; and forming a plastic body over the weight.

2. The method of claim 1 and further comprising the steps of:

applying paint to the body.

* * * * *